(12) United States Patent
Melz et al.

(10) Patent No.: US 8,061,763 B2
(45) Date of Patent: Nov. 22, 2011

(54) DEVICE FOR A MOTOR VEHICLE FOR PROTECTING VEHICLE OCCUPANTS WHEN THERE IS AN IMPACT OF ENERGY DIRECTED AT A MOTOR VEHICLE DOOR DUE TO A COLLISION

(75) Inventors: Tobias Melz, Darmstadt (DE); Björn Seipel, Florstadt (DE); Thorsten Koch, Seeheim-Jugenheim (DE); Johannes Käsgen, Darmstadt (DE); Eric Zimmerman, Kassel (DE); Christo Gavrilov, München (DE); Vlad Radu Muntean, Somcuta Mare (RO)

(73) Assignees: Fraunhofer-Gesellschaft zur Forderung der angewandten Forschung e.V., Munich (DE); Faurecia Innenraum Systeme GmbH, Hagenbach (DE)

( * ) Notice: Subject to any disclaimer, the term of this patent is extended or adjusted under 35 U.S.C. 154(b) by 149 days.

(21) Appl. No.: 12/441,937

(22) PCT Filed: Jul. 19, 2007

(86) PCT No.: PCT/EP2007/006441
§ 371 (c)(1),
(2), (4) Date: Dec. 14, 2009

(87) PCT Pub. No.: WO2008/034481
PCT Pub. Date: Mar. 27, 2008

(65) Prior Publication Data
US 2010/0109378 A1 May 6, 2010

(30) Foreign Application Priority Data
Sep. 19, 2006 (DE) .................... 20 2006 014 549 U

(51) Int. Cl.
*B60R 21/02* (2006.01)
*B60J 5/04* (2006.01)

(52) U.S. Cl. ........... 296/187.03; 296/187.12; 296/146.6; 296/68.1

(58) Field of Classification Search .............. 296/187.03, 296/187.05, 187.12, 193.05, 203.03, 193.02, 296/68.1, 146.6
See application file for complete search history.

(56) References Cited

U.S. PATENT DOCUMENTS
4,231,607 A * 11/1980 Bohlin ............................. 296/63
(Continued)

FOREIGN PATENT DOCUMENTS
DE 2 215 674 3/1972
(Continued)

*Primary Examiner* — Glenn Dayoan
*Assistant Examiner* — Gregory Blankenship
(74) *Attorney, Agent, or Firm* — Antonelli, Terry, Stout & Kraus, LLP.

(57) ABSTRACT

The invention relates to a device for a motor vehicle for protecting vehicle occupants when there is an impact of energy directed laterally at a motor vehicle door due to a collision, having a connecting structure which has at least two parts with a first part permanently connected with the motor vehicle door and a second part permanently connected with an energy-absorbing region of the motor vehicle body located in the vehicle interior. Both parts via at least one common joint region can be operationally connected with each other to conducting-away of at least part of the energy input laterally acting on the motor vehicle door in the region of the motor vehicle body. The energy impact acting on the motor vehicle door is conducted away from the pivot bearing by a force acting linearly and horizontally via the first and the second part to the first end of the second part permanently connected with the motor vehicle body.

23 Claims, 1 Drawing Sheet

U.S. PATENT DOCUMENTS

| | | | |
|---|---|---|---|
| 5,328,234 A * | 7/1994 | Daniel et al. | 297/216.16 |
| 5,435,618 A * | 7/1995 | Sacco et al. | 296/187.12 |
| 5,580,119 A * | 12/1996 | Uchida et al. | 296/146.6 |
| 5,584,525 A * | 12/1996 | Nakano et al. | 296/68.1 |
| 5,938,265 A * | 8/1999 | Oyabu et al. | 296/68.1 |
| 6,113,185 A * | 9/2000 | Yamaguchi et al. | 297/216.1 |
| 6,237,991 B1 | 5/2001 | Weber | |
| 6,299,238 B1 * | 10/2001 | Takagi et al. | 296/187.12 |
| 6,299,239 B1 * | 10/2001 | Sagawa et al. | 296/187.12 |
| 6,869,132 B2 * | 3/2005 | Wang et al. | 296/187.12 |
| 7,104,592 B2 * | 9/2006 | Song | 296/187.12 |
| 7,246,845 B2 * | 7/2007 | Rashidy et al. | 296/187.12 |
| 7,413,242 B2 * | 8/2008 | Rashidy et al. | 296/193.02 |
| 7,481,486 B2 * | 1/2009 | Rashidy et al. | 296/193.02 |
| 7,547,062 B2 * | 6/2009 | Melz et al. | 296/187.12 |
| 7,581,781 B2 * | 9/2009 | Brunner et al. | 296/187.03 |
| 7,699,347 B2 * | 4/2010 | Shoap | 280/784 |
| 2004/0183337 A1 | 9/2004 | Wang et al. | |
| 2006/0038428 A1 | 2/2006 | Song | |
| 2006/0202513 A1 | 9/2006 | Matsuda | |
| 2007/0080013 A1 * | 4/2007 | Melz et al. | 180/274 |
| 2010/0109378 A1 * | 5/2010 | Melz et al. | 296/187.12 |

FOREIGN PATENT DOCUMENTS

| | | |
|---|---|---|
| DE | 41 25 229 C2 | 2/1993 |
| DE | 295 09 229 U1 | 11/1995 |
| DE | 196 33 637 A1 | 2/1998 |
| DE | 298 07 644 U1 | 7/1998 |
| DE | 198 39 519 A1 | 3/2000 |
| DE | 100 57 151 A1 | 6/2001 |
| DE | 10 2004 062 097 A1 | 7/2006 |
| EP | 1 700 776 A1 | 9/2006 |

* cited by examiner

DEVICE FOR A MOTOR VEHICLE FOR PROTECTING VEHICLE OCCUPANTS WHEN THERE IS AN IMPACT OF ENERGY DIRECTED AT A MOTOR VEHICLE DOOR DUE TO A COLLISION

BACKGROUND OF THE INVENTION

1. Field of the Invention

The invention relates to a device for a motor vehicle for protecting vehicle occupants when there is an impact of energy directed laterally at a motor vehicle door due to a collision, having a connecting structure which has at least two parts, a first part and a second part, of which the first part is connected in a fixed manner with the motor vehicle door and the second part is connected in a fixed manner with an energy absorbing region of the motor vehicle body located in the vehicle interior and both parts, via at least one common joint region for conducting away at least part of the energy input laterally acting on the motor vehicle door which can be brought into operational connection with each other in the region of the motor vehicle body.

2. Description of the Prior Art

The protection of occupants in motor vehicles is considered one of the main tasks in the design and new development of motor vehicles. A separate development objective serves for the configuration of distinct buckling zones in the front and rear regions which are capable of protecting the passenger cell largely securely in the event of front and rear-end collisions. In the case of lateral collisions however, the protection of occupants poses greater problems because of the small deformation paths that are available and the low absorption capacity of the lateral structure of a motor vehicle.

Known solutions for easing the danger to the occupants existing in the case of lateral collisions of motor vehicles provide for stiffening of the motor vehicle door. Profiles integrated in the motor vehicle door, which in vehicle transverse direction possess great stiffness and/or high energy absorption capacity, are known for example. DE 196 33 637 A1 discloses a vehicle door with lateral impact protection in the door frame for which arch-shaped holding bars are provided which in the event of a collision are twisted in such a manner and under a tensile load are deformed in the manner of an arresting net.

Stiffening of the lateral doors of this type by providing corresponding side members however is not always adequate to secure the occupants in serious collision cases since when the lateral door is subjected to an external force, the lateral door can be pushed through the door cutout of the vehicle body so that the survival space of the occupants is drastically confined and the chances of survival are similarly reduced.

In addition, the prior art has a series of measures which are suitable for transmitting forces acting on the lateral door to the vehicle body. For example through suitably large overlap between door and door cutout or through bolts protruding from the edge of the door, which in the event of a collision, engage in reinforced recesses of the door cutout of the motor vehicle body. DE AS 22 15674 for example shows a reinforcement device provided for a motor vehicle door which has a beam arched to the outside whose end sections upon deformation of the beam brought about by an external impact in a stretched shape enter into suitably stable recesses within the door frame. The beam preferentially has a profiled steel plate which typically is brought into the appropriate shape through forming.

To avoid an increase of the dead weight of the motor vehicle due to the above measures, a reinforcement device provided for a motor vehicle door is described in DE 41 25 299 C2 which, for the sake of weight reduction, has a reinforcement arch-shaped beam device which is manufactured of fiber-reinforced composite material. In this case, too, the reinforcement device is entirely located within the door which, in the event of a collision, because of the concomitant deformation of the reinforcement beam, emerges from the door with the end regions on both sides, which in turn engage in operational interaction with stable support flanks in the doorframe of the motor vehicle body.

A passenger cell is shown in DE 198 39 519 A1 which functions as a protection device for the vehicle occupants in the event of a lateral collision which provides a cross member construction in the event of a collision for establishing a rigid transverse connection between the vehicle door and the center console so that the sitting region is protected against vehicle door regions entering the passenger cell. The cross member construction merely is activated in the event of a collision by pyrotechnical or pneumatic actuators which extend the jointed cross member construction design while forming a stable cross connection which is otherwise integrated in the seat, door and center console covering.

SUMMARY OF THE INVENTION

Relative to the aforementioned prior art, the invention is a safety system which optimizes the protection of the occupants which, in the event of a lateral impact or a collision situation similar to the lateral impact, is able to provide increased occupant protection. The goal more preferably is to improve the safety system in that the deformation energy laterally acting on a motor vehicle door, in the event of a collision, is deliberately and securely conducted away from the region of the motor vehicle door in order to ultimately prevent the occupant space from being excessively reduced through deformations of the motor vehicle door due to a collision or parts of the motor vehicle door injuring the occupants upon entering. The measures to be taken for this should require the least building space possible and should be of a simple construction so that a high degree of reliability and a preferably cost-effective manufacturing are possible at the same time.

The device for a motor vehicle for protecting vehicle occupants when there is an impact of energy directed laterally at a motor vehicle door having a connecting structure which has at least two parts. The first part is connected in a fixed manner with the motor vehicle door and the second part is connected in a fixed manner with an energy-absorbing region of the motor vehicle body located in the vehicle interior. Both parts via at least one common joint region provide the conducting-away of at least part of the energy impact in the region of the motor vehicle body laterally acting on the motor vehicle door, by operationally being connected. The first part is coupled in a rotatably fixed fashion to a pivot bearing within the motor vehicle door and can be reversibly moved from a vertical position into a horizontal position through the impact of force. The second part is a rod or tube having a first end which is permanently connected with the motor vehicle body, and the second part has a second end which lies opposite the first end and can be reversibly moved from a first position into a second position through horizontal linear movement and through impact of force. The first part in the horizontal position and the second part in the second position can be operatively connected by means of a common joint region. The impact of energy acting on the motor vehicle door can be conducted away from the pivot bearing via the first and second parts to the first end of the second part, which is permanently connected to the motor vehicle body work, along a linearly and horizontally oriented force flux.

In contrast with the known solutions to increase the stiffness of motor vehicle doors described above, wherein lateral impact beams protrude through the motor vehicle door which in the event of a collision laterally enter more sturdy body regions so as to redirect the crash energy directed at the motor vehicle door transversely to the operational direction in an extreme case, according to the publications DE-AS 2215674 and DE 196 33637 A1. The invention provides a sturdy connecting structure connected with the motor vehicle door already described in the above-identified DE 198 39 519 A1, through which the crash energy, more preferably as a lateral impact, is conducted away substantially parallel in the operational direction into a sturdy body region located within the vehicle interior. This embodiment according to the invention differs however through the substantially simpler realization and simplified construction as a result of which the invention can be made lighter, more cost effective and more reliable in its operation than the prior art. In addition to this, the embodiment according to the invention requires far less space in the vehicle as a result of which the use of the invention is highly attractive in the motor vehicle sector.

To realize a longitudinally stiff support in the event of a crash which acts between the motor vehicle door and a sturdy motor vehicle body region located in the motor vehicle interior, a first part, which preferentially is embodied as tube section with a rectangular cross section (cross sections deviating from the rectangular shape are also conceivable) and with respect to shape and length is dimensioned so that the first part can be completely integrated in the interior of a motor vehicle door, wherein the first part is rotatably mounted about a pivot axis within the motor vehicle door and can be transferred from a vertical into a horizontal position. On the other hand, a second part is provided within the motor vehicle space which is likewise embodied in the shape of a rod or tube, but is longer than the first part and has one end permanently connected with a sturdy motor vehicle body region or to a stiff part of the tunnel. The second part is horizontally mounted and preferentially protrudes through at least one motor vehicle seat and ends with an outer contour of the seat facing the motor vehicle door. In contrast with the first part, which is one piece, the second part has at least two pieces and comprises two rod or tube sections which telescope to be longitudinally moveable relative to each other including a section which is permanently connected with the sturdy motor vehicle body region and another section which is mounted to be longitudinally moveable. For example, the moveable section may be a bolt and is moveably guided longitudinally within the permanently attached section which is a tube. In addition, a force element in the form of a spring acts on the moveably embodied bolt as a result of which the bolt, upon free movement, is driven in the direction opposite the fixed stationary section. A retaining means of a SMA (shape memory alloy) material causes the bolt to remain within the fixed tubular section.

In a starting situation, which corresponds to the normal operating state of the motor vehicle, both parts are spaced from each other, that is the first part is located within the motor vehicle door in a vertical position which is not visible from the outside. Here, the first part does not take up any space or only very little space so, as a result of which the door function and the components connected therewith, such as the side window, are not impaired. It is not necessary to create additional space within the motor vehicle door and the first part can be integrated in any motor vehicle door without problems. The second part protrudes through the motor vehicle seat as a horizontal longitudinal extension transversely to the direction of driving of the motor vehicle. In an advantageous manner, channels which are present within the motor vehicle seat, are utilized to pass through the second part so that the integration effort and the space requirement for the second part within the motor vehicle does not have a significant role at all. The free end of the second part, which as explained above, has two sections, that is, the free end of the longitudinally moveable section which protrudes over the permanently attached tube preferentially ends flush with the shape of the lateral contour of the motor vehicle seat, so that the second part does not appear to be obviously evident and further does not impair the function of both the motor vehicle seat and also the adjoining components.

Both free ends of the first as well as the second parts comprise support faces which, as will be described in the following, are capable of engaging a joint connection in the event of an impending collision.

Similar to a retaining aid of an SMA material of the second part to prevent a one-sided linearly guided emergence of the bolt from the tubular section under the effect of spring force, the first part is likewise secured with a corresponding SMA retaining material against uncontrolled rotation from the vertical position into the horizontal position under the influence of spring force. In the region of the pivot bearing, the first part is connected with a rotary spring element, which is, for example, in the form of a helical spring, as a result of which a rotational moment directed in the horizontal position acts on the first part.

In other words, in the normal operating state of the motor vehicle for both parts being in a tensioned starting position each, each part is held by retaining aids consisting of SMA material through which the supply of electrical energy can be triggered almost free of any delay as a result of which both parts following the respective mechanical influence of a collision suddenly change into their respective positions, that is, the first part is tilted into the horizontal position and the second part as an extension as far as immediately adjoining the inside of the motor vehicle door inner wall covering. The first part in its horizontal position rotates into a space region which is for the side window pane and would even break through the latter should it remain in a lowered window position. In this position both parts immediately face each other on a face end along a common horizontal axis and are merely separated through a thin-walled motor vehicle door inner wall covering. The support faces provided in this position on the respectively free ends of the first and second part are additionally capable of further securing the mutual support.

In a preferred further embodiment of the invention, the support faces can also be embodied with reversible interlocking parts as a result of which a force connection between the first and second parts can be improved.

Both parts themselves could also consist of converter materials or at least sections of the first and second part being manufactured from a corresponding converter material in order for example to obtain a crash-specific damping behaviour along the connecting structure embodied according to the invention.

Reversibility must be mentioned as particular advantage of the device according to the invention, that is, in the event that the first and second parts have been triggered without a crash having occurred, it is easily possible to return the parts to the "tensioned normal state" described above. So-called pre-crash sensors, which in a manner known per se are attached to a motor vehicle and are based on a decision-making criteria, are capable of detecting a collision which is deemed unavoidable even before the event of the collision serves to trigger the SMA retaining aids. Because of the reversibility, the requirements to which the pre-crash sensors are subjected are lower since no major damage will result in the event of false triggering.

To further explain the device for the protection of occupants when there is an impact of energy directed at a motor vehicle door, reference is made to the sole exemplary embodiment described below making reference to FIGS. 1a and 1b.

DETAILED DESCRIPTION OF THE INVENTION

Figure 1A:
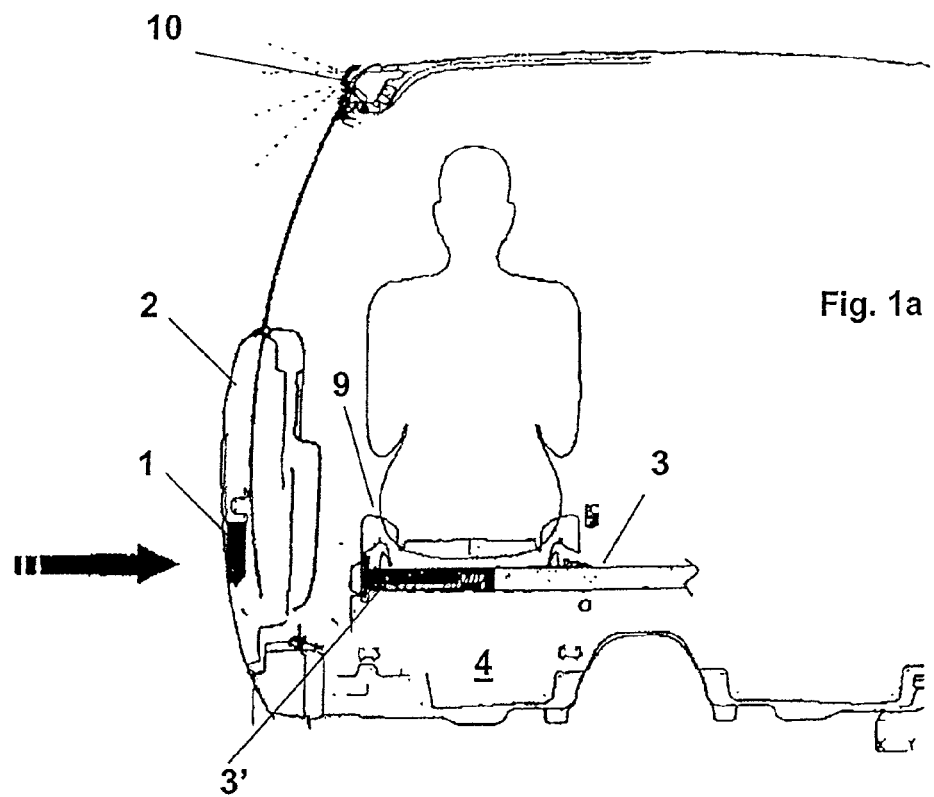
FIG. 1a shows a schematic cross-sectional view through a motor vehicle cell at the height of the driver's seat in the normal state, wherein the first part 1 assumes a vertical position within the motor vehicle door 2 and the second part 3 assumes a position drawn back within the driver's seat 4.
Figure 1B:
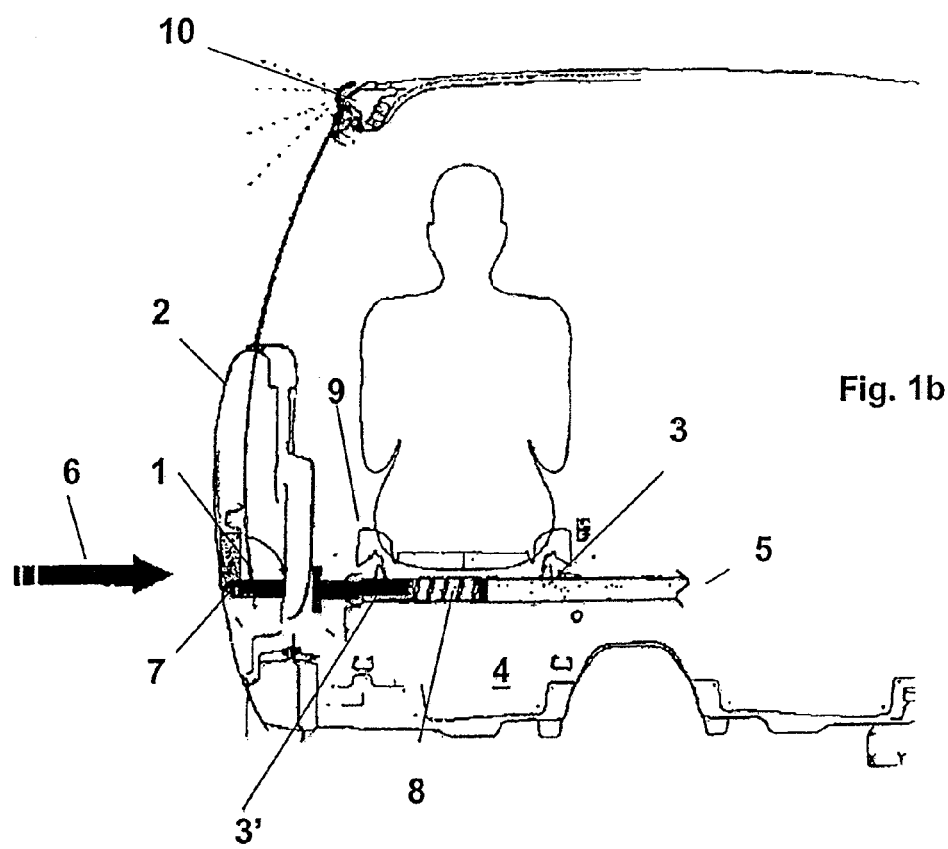
FIG. 1b, in contrast, shows the triggered state wherein the first part 1 is rotated in the horizontal position and the second part 3 has moved into the extended position. In this position, both parts 1 and 3 meet at the face ends as a result of which a linear horizontally oriented connecting structure is formed between the motor vehicle door 2 and a sturdy body region 5 located in the interior, alongside which a crash energy input 6 acting on the motor vehicle from the outside can be conducted away.

The first part is preferentially formed of a tube with a rectangular cross section and within the motor vehicle door 2 is connected via a pivot bearing 7 capable of rotating about a horizontal axis. The second part 3 is embodied as tubular actuator with bolt 3' located inside. The bolt 3' is preloaded with a spring aid but is initially retained in the tube by means of a retaining aid 9 of SMA wire. The tube in the door in contrast is preloaded through a rotary spring and is likewise retained by an SMA retaining aid in normal driving situations. In the event of a foreseeable crash, both retaining aids are triggered based on a detection signal of pre-crash sensors 10, that is, the bolt 3' emerges from the tube on the motor vehicle seat 4 and bridges the gap between seat 4 and door inner covering so that the face end of the bolt 3' comes to rest against the door inner covering. At the same time, the rectangular tube 1 rotates in the door box and thus closes the space in the door box which is normally required for the window operation. In the triggered state, both parts 1 and 3 are located in a horizontal line, direct contact is only prevented through the material thickness of the door covering.

The tube actuator 3 on the seat is connected on the other side of the seat with a stiff part of the tunnel or another stiff part 5 of the vehicle side located opposite thereto.

Through the activation of both parts 1 and 3, a stiff composite, which is positioned horizontally, is created which conducts the crash introduced energy 6 away from the door 2 to the tunnel or better still to the other vehicle side. The crash loads are normally absorbed by the B-pillar, while in the present case the B-pillar would be effectively unloaded more so since a new load path that is independent of the B-pillar has been installed.

The device according to the invention reduces the passenger loads to an effective degree since:

A support and thus reduction of the intrusion in the door takes place directly where the occupant is seated.

By unloading the B-pillar, the intrusion of the B-pillar and thus that of the entire vehicle side is reduced.

Through the supporting effect directly in the sitting region of the occupant a reduction of the intrusion in the event of an accident can also be expected which is not depicted in the test specifications to date.

LIST OF REFERENCE NUMBERS

1 First part
2 Motor vehicle door
3 Second part
3' Bolt
4 Motor vehicle seat
5 Sturdy body region
6 Energy impact
7 Pivot joint
8 Spring
9 Retaining means
10 Pre-crash sensor

The invention claimed is:

1. A device for a motor vehicle for protecting vehicle occupants from an impact of energy laterally directed at a motor vehicle door due to a collision, comprising a connecting structure with at least two parts, a first part thereof being permanently connected with the motor vehicle door and a second part thereof being permanently connected with an energy-absorbing region of a body of the motor vehicle located in an interior of the body, the parts being operationally connectable to each other via at least one common joint region for conducting away at least a part of the impact of energy laterally directed at the motor vehicle door, wherein the first part is coupled in a rotatably fixed fashion to a pivot bearing within the motor vehicle door and is reversibly movable from a vertical position into a horizontal position through the impact of force and the second part comprises one of a rod or tube with a first end permanently connected with the body and the second part has a second end positioned opposite the first end and is reversibly movable from a first position to a second position through horizontal linear movement and through the impact of the force, and the first part when in a horizontal position and the second part when in a second position are operatively connectable by the common joint region, the impact of force when acting on the motor vehicle door being conducted away from the pivot bearing via the first and second parts to the first end of the second part, which is permanently connected to the motor vehicle bodywork.

2. The device according to claim 1, wherein the first part comprises a rod or tube and is movable from the vertical position into the horizontal position by a spring force.

3. The device according to claim 1, wherein at the pivot bearing at least one rotary spring element is coupled to the first part for moving the first part from the vertical position into the horizontal position.

4. The device according to claim 1, wherein the first part comprises a tube with a rectangular cross section having one end permanently fastened to the pivot axis of the pivot bearing and another free end, the tube comprising a support face and having a length that is smaller in dimension than a maximum thickness of the motor vehicle door.

5. The device according to claim 1, wherein the second part comprises first and second tube sections which telescopically engage each other, the first tube section being permanently connected with the motor vehicle body, mounted for linear movement, and being subjected to a force provided by at least one actuator element to linearly drive the first tube section away from the second tube section.

6. The device according to claim 5, wherein the actuator element is a spring.

7. The device according to claim 1, comprising retaining elements provided on the first and second parts, the first part remaining in a vertical position and the second part remaining in a first position, and the retaining elements being subject to triggering at the same time so that moving of the first part into the horizontal position and moving of the second part into the second position is possible at the same time.

8. The device according to claim 7, wherein the retaining element comprises a SMA material or a shape memory material that can be triggered to change shape by application of electrical energy thereto.

9. The device according to claim 1, wherein the second part protrudes at least partially through a seat of the motor vehicle.

10. The device according to claim 1, comprising an approximation sensor system on or in a motor of the motor vehicle for sensing an unavoidable collision and generating a signal causing the first and the second parts to respectively move into the horizontal position and into the second position.

11. The device according to claim 1, wherein the first part in the horizontal position is within the motor vehicle door which, during vehicle operation, is occupied by another motor vehicle component.

12. The device according to claim 1, wherein the first and second parts in the joint region each comprise contours in conformity with respect to each other.

13. The device according to claim 2, wherein at the pivot bearing at least one rotary spring element is coupled to the first part for moving the first part from the vertical position into the horizontal position.

14. The device according to claim 2, wherein the first part comprises a tube with a rectangular cross section having one end free permanently fastened to the pivot axis of the pivot bearing and another free end, the tube comprising a support face and having a length that is smaller in dimension than a maximum thickness of the motor vehicle door.

15. The device according to claim 3, wherein the first part comprises a tube with a rectangular cross section having one end free permanently fastened to the pivot axis of the pivot bearing and another free end, the tube comprising a support face and having a length that is smaller in dimension than a maximum thickness of the motor vehicle door.

16. The device according to claim 2, wherein the second part comprises first and second tube sections which telescopically engage each other, the first tube section being permanently connected with the motor vehicle body, mounted for linear movement, and being subjected to a force provided by at least one actuator element to linearly drive the first tube section away from the second tube section.

17. The device according to claim 3, wherein the second part comprises first and second tube sections which telescopically engage each other, the first tube section being permanently connected with the motor vehicle body, mounted for linear movement, and being subjected to a force provided by at least one actuator element to linearly drive the first tube section away from the second tube section.

18. The device according to claim 4, wherein the second part comprises first and second tube sections which telescopically engage each other, the first tube section being permanently connected with the motor vehicle body, mounted for linear movement, and being subjected to a force provided by at least one actuator element to linearly drive the first tube section away from the second tube section.

19. The device according to claim 2, comprising retaining elements provided on the first and second parts, the first part remaining in a vertical position and the second part remaining in a first position, and the retaining elements being subject to triggering at the same time so that moving of the first part into the horizontal position and moving of the second part into the second position is possible at the same time.

20. The device according to claim 3, comprising retaining elements provided on the first and second parts, the first part remaining in a vertical position and the second part remaining in a first position, and the retaining elements being subject to triggering at the same time so that moving of the first part into the horizontal position and moving of the second part into the second position is possible at the same time.

21. The device according to claim 4, comprising retaining elements provided on the first and second parts, the first part remaining in a vertical position and the second part remaining in a first position, and the retaining elements being subject to triggering at the same time so that moving of the first part into the horizontal position and moving of the second part into the second position is possible at the same time.

22. The device according to claim 5, comprising retaining elements provided on the first and second parts, the first part remaining in a vertical position and the second part remaining in a first position, and the retaining elements being subject to triggering at the same time so that moving of the first part into the horizontal position and moving of the second part into the second position is possible at the same time.

23. The device according to claim 6, comprising retaining elements provided on the first and second parts, the first part remaining in a vertical position and the second part remaining in a first position, and the retaining elements being subject to triggering at the same time so that moving of the first part into the horizontal position and moving of the second part into the second position is possible at the same time.

* * * * *